United States Patent

Sanderson et al.

[15] 3,699,171

[45] Oct. 17, 1972

[54] PROCESS FOR THE OXIDATION OF ARYL ALKYL SULFOXIDES TO ARYL ALKYL SULFONES

[72] Inventors: John L. Sanderson, Medford, Oreg.; Edward W. Swift, Denver, Colo.

[73] Assignee: Shell Oil Company, New York, N.Y.

[22] Filed: Aug. 28, 1970

[21] Appl. No.: 68,040

[52] U.S. Cl. ............................................260/607 A
[51] Int. Cl................................................C07c 147/06
[58] Field of Search..................................260/607 A

[56] References Cited

UNITED STATES PATENTS 2,935,532  5/1960  Hübenett et al. .......260/607 A

OTHER PUBLICATIONS

Wagner et al. " Synthetic Organic Chemistry" 746–747 (1953) QF 262W24

*Primary Examiner*—Lewis Gotts
*Attorney*—Frank R. La Fontaine and Marion W. Western

[57] ABSTRACT

An aryl alkyl sulfone is produced by reacting a corresponding aryl alkyl sulfoxide with a nitrogen oxide in the presence of sulfuric acid and molecular oxygen.

14 Claims, No Drawings

PROCESS FOR THE OXIDATION OF ARYL ALKYL SULFOXIDES TO ARYL ALKYL SULFONES

BACKGROUND OF THE INVENTION

This invention comprises a process of the production of aryl alkyl sulfones, especially of p-chlorophenyl methyl sulfone, which can be used in the manufacture of 4-(methylsulfonyl)-2,6-dinitro-N,N-dipropylaniline, claimed as a novel compound in U.S. Pat. No. 3,227,734 and commercially marketed under the tradename PLANAVIN Herbicide. This sulfone also, can easily be nitrated to form 4-chloro-3,5-dinitrophenylemethyl sulfone and 4-chloro-3-nitrophenyl methyl sulfone, which also can be used as intermediates in the manufacture of 4-(methylsulfonyl)-2,6-dinitro-N,N-dipropylaniline (U.S. Pat. No. 3,227,734).

DESCRIPTION OF THE PRIOR ART

The use of a nitrogen oxide in the oxidation of sulfides and sulfoxides to sulfones is generally known in the field of organic chemistry. However, to obtain sufficiently good yields to make use of a nitrogen oxide in such an oxidation process commercially feasible it has heretofore been considered necessary to use a catalyst to increase the reaction rate. For example, in U.S. Pat. No. 2,870,163 osmium tetroxide is used to catalyze the oxidation of a sulfide to a sulfone using a nitrogen oxide. Other methods not employing a nitrogen oxide are also used to produce sulfones. For example, U.S. Pat. No. 3,006,963 teaches that aryl alkyl sulfones can be prepared by the oxidation of the corresponding sulfoxide with 35 percent weight hydrogen peroxide using tungstic acid as a catalyst.

SUMMARY OF THE INVENTION

It has now been discovered that aryl alkyl sulfones can readily be prepared by reacting the corresponding sulfoxide with a nitrogen oxide in the presence of sulfuric acid and molecular oxygen. No catalyst is necessary, yet nearly quantitative conversion of the sulfoxide to the sulfone results.

The process of this invention is of particular interest with respect to the manufacture of p-chlorophenyl methyl sulfone (PCPMS), and provides important advances over other known processes for preparing this compound. In the past, it has been found possible to prepare PCPMS by treating the p-chlorophenyl methyl sulfide with hydrogen peroxide in the presence of sulfuric acid. The reaction goes slowly, but can be speeded up by use of a suitable catalyst such as tungstic acid as taught in U.S. Pat. No. 3,006,963. These processes both required that the reaction be carried out in aqueous liquid phase. In the manufacture of the herbicide, the subsequent nitration of PCPMS requires that the PCPMS is essentially dry or that it is in a media which will not interfere in the subsequent nitration step. Therefore it has been necessary that the PCPMS prepared by treatment with hydrogen peroxide be separated from the aqueous phase and dried before it can be nitrated. To accomplish the isolation of the p-chlorophenyl methyl sulfone, additional time and equipment are required, and to reduce the losses of the sulfone to the aqueous phase at this point, it is necessary to incorporate recovery steps.

In contrast, the process of this invention produces PCPMS which can be nitrated directly without further treatment. The corresponding sulfoxide is converted to the PCPMS merely by reacting the sulfoxide with a nitrogen oxide in the presence of sulfuric acid and molecular oxygen. The resulting mixture of sulfone and sulfuric acid can, without additional treatment or isolation of the sulfone be directly nitrated in the next step to obtain the dinitrated sulfone which can be the next intermediate in the process to obtain the desired herbicide. It can be seen that by eliminating the need to isolate and dry the PCPMS significant simplification of the existing commercial plant process is realized.

A further advantage of the process of this invention is that along with PCPMS, 3-nitro-4-chlorophenyl methyl sulfone is produced, which also can be used in the production of the herbicide (example I, U.S. Pat. No. 3,227,734). It has been discovered that when p-chlorophenyl methyl sulfoxide is reacted with nitrogen dioxide in the presence of sulfuric acid and molecular oxygen a small percentage of 3-nitro-4-chlorophenyl methyl sulfone is formed and that the amount of this mono-nitrated product is increased by using oleum in place of sulfuric acid. By replacing the sulfuric acid with fuming sulfuric acid (oleum) in the oxidation of the sulfoxide the requirement for the nitric acid in the subsequent step will be accordingly decreased.

Also, since the aqueous phase will be eliminated from the existing process by utilizing the process of this invention, loss in yield of sulfone to the aqueous phase is also eliminated, a net increase in yield is realized and additional expense for recovery facilities is not necessary.

Finally, the cost of the hydrogen peroxide is eliminated by using instead a nitrogen oxide, such as nitrogen dioxide, which is readily available from the vent gases from the subsequent nitration reaction. These vent gases can easily be circulated back to the oxidation step for utilization at that point.

Each of these four advantages contributes to increasing the overall efficiency of the process for making 4-(methylsulfonyl)-2,6-dinitrophenyl-N,N-dipropylaniline.

In general then, this invention is an improved process for the production of aryl alkyl sulfones, especially of p-chlorophenyl methyl sulfone and 3-nitro-4-chlorophenyl methyl sulfone which can be intermediates used in the production of PLANAVIN Herbicide.

DESCRIPTION OF PREFERRED EMBODIMENTS

The aryl alkyl sulfoxides which may be converted to sulfones in accordance with this invention are characterized by the following formula:

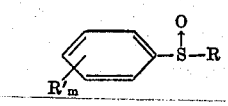

wherein R is an alkyl containing from one to 20 carbon atoms, R' is halogen and $m$ is an integer having values from 0 to 5. Suitable alkyl substituents are methyl, ethyl, propyl, butyl, pentyl, hexyl, septyl, octyl, nonyl, decyl, dodecyl, pentadecyl, eicosyl and the like and isomers thereof. It is preferred that R be methyl, ethyl, propyl, and butyl or isomers thereof and especially preferred that R is methyl. Suitable halogen for R' can be fluorine, chlorine, bromine and iodine, but chlorine and bromine are preferred. Chlorine is especially preferred. Although $m$ can have values from 0 to 5, it is preferred that the values be 0 to 3 and especially preferred to be 1. If $n$ is 1, it is preferable that the R' be located para to the position at which the sulfur is attached to the ring.

There are several means of obtaining the sulfoxide for use in the process of this invention. For example, the sulfoxide can be obtained by purchasing from an outside source and reacting the sulfoxide thus obtained according to the method of the invention. However, in many cases, the sulfoxide is not as readily available or is more expensive than the corresponding sulfide from which it is derived. In those cases, it may be preferable to prepare the sulfoxide from the corresponding sulfide and react the resulting sulfoxide thus obtained with a nitrogen oxide in the presence of sulfuric acid and molecular oxygen to form the sulfone. It is generally known in the art that nitrogen oxides, especially nitrogen dioxide, can be utilized to oxidize sulfides to sulfoxides in suitable yields and that no catalysts will be required. The sulfoxide formed in this manner can be taken directly, mixed with sulfuric acid and further reacted with a nitrogen oxide in the presence of molecular oxygen to form the sulfone. It will usually be unnecessary to further treat the reaction product containing the sulfoxide formed by this method. The nitrogen oxide which will reside in the reaction mixture will not have to be removed since nitrogen dioxide is used again in the next step. Thus it can be seen that great advantage can be gained by combining these two steps on a commercial scale. For example, the sulfide could be transferred into a suitable reaction vessel, reacted with the nitrogen oxide and molecular oxygen sufficiently to obtain the sulfoxide, then in the same vessel the sulfuric acid could be added and the resulting mixture could then be further reacted with a nitrogen oxide in the presence of molecular oxygen to form the desired sulfone.

The molecular oxygen can be obtained from air, air enriched with molecular oxygen, a synthetic mixture of an inert gas, such as nitrogen, and molecular oxygen, or pure molecular oxygen.

Examples of nitrogen oxide which are suitably used in the process of this invention are nitric oxide (NO), nitrogen dioxide ($NO_2$), nitrogen pentoxide ($N_2O_5$) and nitrogen tetroxide ($N_2O_4$). The nitrogen oxide may be added in an undiluted state as a liquid or a gas or dissolved in the sulfide or the sulfoxide. The preferred nitrogen oxide is nitrogen dioxide.

The conversion of the sulfide to the sulfone by process of this invention can also be effected by utilizing a continuous system. For example, a two stage continuous system was devised wherein the sulfide, nitrogen dioxide and molecular oxygen were reacted in the first stage, where each is fed at a specific rate and reacted at conditions calculated to give a sufficient resident time. Sulfoxide product from the first stage was continuously fed to the second stage by maintaining a constant positive pressure differential between the two stages. At the second stage, the sulfoxide from the first stage (untreated), sulfuric acid, nitrogen dioxide and molecular oxygen were fed at continuous rates under conditions sufficient to allow a sufficient resident time during which the reaction was completed.

The conversion of a sulfide to a sulfone via a continuous system according to the process of this invention is not limited to execution only in reaction vessels such as tanks. For example, the reactions could be carried out in a pipe line reactor wherein the sulfide, nitrogen oxide and molecular oxygen are fed in at one end of the pipe and thoroughly mixed while they are circulated through the pipe. At a point further down the pipe sulfuric acid, additional nitrogen oxide and additional oxygen are fed to the reaction mixture containing the sulfoxide. The resultant reaction mixture is circulated further until the reaction is sufficiently complete.

A method of preparing the sulfoxide for use in the process of this invention can be effected merely by bubbling the nitrogen oxide through the corresponding liquid sulfide at room temperature and atmospheric pressure in a vessel open to the air. This results in good conversions, but to improve the conversion and increase reaction rate it is preferred to carry out the reaction in a pressure reactor at superatmospheric pressures using an atmosphere enriched in molecular oxygen (25 percent by weight or more) and reacting the sulfide with the nitrogen oxide. Good conversions occur at temperatures ranging between about 20° to 150° C. However, temperatures at the upper end of this range may result in lower yield. Also, the lower limit of operating temperature is influenced by the melting point of the sulfide and the sulfoxide. Where the sulfide is a liquid at ambient temperatures, reactions have been successively run at temperatures below the usual melting point of the resulting sulfoxide, which is permissible probably because of a melting point depression due to dissolved nitrogen oxide and is also influenced by the supercooling ability of the sulfoxide. For these reasons it is preferable to run the reaction approximately between the melting point of the sulfoxide and about 100° C. or between about 40° to 100° C.

The preparation of sulfoxide from sulfide can take place at atmospheric pressure but it is preferable for reaction rate considerations to run at superatmospheric pressure. If atmospheric pressure is used, however, it will be necessary to use nearly stoichiometric amounts (i.e., one mole of the nitrogen oxide for a mole of sulfide) or more of nitrogen oxide to sufficiently effect the oxidation of the sulfide. If superatmospheric pressure is used the mole ratio of nitrogen dioxide to sulfide can be substantially reduced and it can be further reduced by using a gas enriched in molecular oxygen at superatmospheric pressures. Under the preferred conditions of temperature and superatmospheric pressure and a gas enriched in molecular oxygen the mole ratio of nitrogen oxide to sulfide can vary from 0.05/1 to 1.0/1. One method by which the reaction is carried out is by filling a pressure vessel with the sulfide, attaining the desired reaction temperature, pressuring the reaction vessel with molecular oxygen to the desired pressure and finally pressuring the nitrogen oxide into the vessel at a rate low enough for a good temperature control of the reaction. All of the molecular oxygen need not be present at the start of the reaction but is made readily available, since throughout the reaction the oxygen is placed on demand at the pressure of the reaction vessel. By this method the mole ratio of the nitrogen oxide to sulfide can vary between 0.05:1 to 1.0:1 with the range of from 0.05:1 to 0.15 being especially preferred. The pressure can vary from 15 pounds per square inch gauge (hereafter referred to as pounds per square inch) to 500 pounds per square inch or more but it has been found that a pressure of no more than 100 pounds per square inch is necessary for excellent conversions. For this reason the range from about 15 pounds per square inch to 100 pounds per square inch is preferred.

Once the sulfoxide is in hand, it is converted to the sulfone by the process of this invention at atmospheric or superatmospheric pressure. Here, also because of reaction rate considerations, superatmospheric pressure is preferred. Generally the reaction is carried out by mixing the sulfuric acid with the sulfoxide in a pressure reactor, pressuring the reactor to the desired superatmospheric pressure with molecular oxygen, obtaining the desired reaction temperature and adding the nitrogen oxide to the reaction vessel at a rate at which the reaction can be controlled. The reaction can be carried out between temperatures of 25° C. to approximately 150° C., however 40° to 120° C. is preferred. The conditions of pressure for utilization of this reaction can vary from atmospheric pressure to more than 500 pounds per square inch, however, it has been found that no more than 100 pounds per square inch is necessary for excellent conversions. For this reason the range from about 15 pounds per square inch to 100 pounds per square inch is preferred. Although conversions of the sulfoxide to the sulfone can take place at atmospheric pressure merely by bubbling nitrogen dioxide through the mixture of sulfuric acid and sulfoxide in a vessel open to the air, stoichiometric amounts or more of nitrogen dioxide are required in order to effect the conversion and conversions are sometimes not complete. It has been found that the requirement for the nitrogen oxide can be substantially reduced by reacting the sulfoxide with the nitrogen oxide in the presence of sulfuric acid and a gas enriched in molecular oxygen at superatmospheric pressures. It is even more preferred that the reaction takes place in pure oxygen. Mole ratios of the nitrogen oxide to sulfoxide can range from about 0.05/1 to 3/1 while the preferred mole ratio of the nitrogen oxide to sulfoxide is between about 0.15/1 to about 0.5/1. The mole ratio of sulfuric acid to sulfoxide can range from about 0.1/1 to more than 10/1. Since it is preferable to carry out this invention under liquid conditions, enough acid should be used to keep the sulfoxide or sulfone dissolved if either one is a solid at the temperatures at which the reaction is run. This amount will vary, of course, with the solubility of the sulfoxide or sulfone in sulfuric acid. The preferred mole ratio of sulfuric acid to sulfoxide is between about 0.3/1 and 3.0/1. The strength of the sulfuric acid can be as low as 50 percent by weight (%w) without adversely affecting the selectivity of the sulfoxide to the sulfone, but it is preferable to use sulfuric acid from a strength of 65 percent weight or more and especially preferred to use 95 percent weight or more sulfuric acid.

If it is desirable to form the nitrated aryl alkyl sulfone, oleum (sulfur trioxide in anhydrous sulfuric) may be used in place of the 95 percent weight sulfuric acid. The oleum may contain up to 100 percent by weight (%w) excess of sulfur trioxide dissolved in anhydrous sulfuric acid; however it has been found that no more than a 50%w excess of sulfur trioxide is required for good results and no more than 30%w is preferred. In the case of p-chlorophenyl methyl sulfoxide, by using oleum in place of the sulfuric acid, a sulfone mixture containing up to about 60 percent by weight of the 3-nitro-4-chlorophenyl methyl sulfone can be obtained depending in part on the concentration of the oleum, temperature, reaction period, etc.

The process of this invention is incorporated with the preferred method of obtaining the sulfoxide as follows: A pressure reactor is pressured with nitrogen to about 20 pounds per square inch gauge. Pressure is increased to about 50–60 pounds per square inch gauge with oxygen and maintained on oxygen demand throughout the ensuing reaction. The reaction temperature is attained, the preferred amount of nitrogen dioxide is pressured into the system and reaction temperature is held for a time sufficient to form the sulfoxide during which time the liquid reaction mixture is constantly stirred. The amount of sulfoxide present in the mixture can be determined by analytical methods known in the art. When sufficient sulfoxide is obtained the effective amount of sulfuric acid can be added to the sulfoxide in the same pressure reactor, the reactor pressurized with a pure molecular oxygen atmosphere to about 50 to 60 pounds per square inch gauge, the reaction temperature attained and nitrogen dioxide added to the reaction vessel while constantly stirring the reaction mixture. After holding the reaction temperature for the required length of time to complete the oxidation, the contents are then transferred to the next step for the nitration.

The following examples further explain the invention.

EXAMPLE I

Preparation of p-chlorophenyl methyl sulfoxide from p-chlorophenyl methyl sulfide via nitrogen dioxide at atmospheric pressure A slow stream of approximately 1 mole of nitrogen dioxide ($NO_2$) was bubbled through approximately 1000 ml of p-chlorophenyl methyl sulfide for 1 hour at 70° F. while the contents were constantly stirred. Dissolved $NO_2$ was removed from the reaction product by stripping at 200° F. and a vacuum of 584 Torr. The resulting yellow product was analyzed to be more than 95 percent by weight (%w) p-chlorophenyl methyl sulfoxide with no traces of the corresponding sulfone.

EXAMPLE II

Preparation of p-chlorophenyl methyl sulfoxide from p-chlorophenyl methyl sulfide via nitrogen dioxide at greater than atmospheric pressure 158.7 grams of mono chlorophenyl methyl sulfide, analyzed to be 94.9%w p-isomer, was charged to a 1.5 liter stainless steel, mechanically stirred, jacketed pressure reactor. The desired temperature of 49° C. was attained, the reactor was pressured to 56 pounds per square inch gauge (psig) with oxygen, and the oxygen was placed on demand feed at this level. The $NO_2$ was pressured into the reactor at a rate slow enough to maintain good temperature control. The mole ratio of NO₂ charged/sulfide charged was about 0.12/1. Reaction time was 30 minutes from the start of the NO₂ addition. After the addition was complete, the pressure was released, the NO₂ swept from the reactor by bubbling air through the product, and the product drained from the vessel. The reactor and utensils used in handling the sulfoxide was rinsed with chloroform, the rinses combined with the sulfoxide, and the chloroform removed from the mixture on a rotary evaporator. The resulting product was analyzed to be 93.5%w p-chlorophenyl methyl sulfoxide which gave a 98.5 percent yield from the p-isomer of the sulfide.

EXAMPLE III

Preparation of the p-chlorophenyl methyl sulfone from p-chlorophenyl methyl sulfoxide via nitrogen dioxide at greater than atmospheric pressure Sulfuric acid, analyzed to be 96.1%w was charged to a reaction vessel as described in Example II and the temperature was brought up to 95° C. The system was then closed and the required charge of NO₂ pressured into the reactor. The total reactor pressure was then brought up to 56 psig with oxygen and this gas placed on demand at that pressure. p-Chlorophenyl methyl sulfoxide, prepared as described in Example II, was added to the reactor in about 6 minutes at a mole ratio of about 0.5 mole NO₂ charged/mole sulfoxide charged and 1.0 mole H₂SO₄ charged/mole sulfoxide charged. The reaction temperature was held steady at about 95° C. for 2½ hours. Air was bubbled through the final product at atmospheric pressure to remove NO₂ and then quenched in a liter of cold water. The reactor was washed with chloroform which was then combined with the quenched product. The product was extracted from the aqueous phase with chloroform, the chloroform removed on a rotary evaporator and the product analyzed. 100 molar percent (%m) of the sulfoxide was reacted with 91.4 percent molar being converted to p-chlorophenyl methyl sulfone and 5.6 percent going to 3-nitro-4-chlorophenyl methyl sulfone which gives a total usable molar yield of 97.0 percent based on p-chlorophenyl methyl sulfide.

EXAMPLE IV

Preparation of a mixture of p-chlorophenyl methyl sulfone and 3-nitro-4-chlorophenyl methyl sulfone 210.7 grams of 20 percent oleum was charged to the reaction vessel as described in Example II and the temperature was brought up to 95° C. The reactor system was closed and the total reactor pressure brought up to 56 psi with oxygen and this gas placed on demand at that pressure. 93.5 grams of 95.6 percent by weight p-chlorophenyl methyl sulfoxide saturated with NO₂ was added to the reactor in 14 minutes, which gave a mole ratio of SO₃/sulfoxide of 1.01 and 3.30 for H₂SO₄/sulfoxide. The contents of the reactor were stirred for 1½ hours at 95° C., after which time the product mixture was added to 500 g of ice. The product was extracted in a manner similar to Example III. Infrared analysis indicated that 100 percent of the sulfoxide was converted with 40.1 percent being converted to p-chlorophenyl methyl sulfone and 57.8 percent being converted to 3-nitro-4-chlorophenyl methyl sulfone, giving an overall yield from the sulfoxide to the desired products of 97.9 percent.

EXAMPLE V

Preparation of p-chlorophenyl methyl sulfone from the corresponding sulfide using a continuous system A two-stage continuous stirred tank reactor system was constructed consisting essentially of two reaction vessels, each equipped with manual vents, rupture discs, sample ports, agitation equipment, pressure and temperature indicators and heating and cooling equipment, and an intermediate storage vessel. The first reaction vessel was a 3-liter capacity while the second held 5-liters. So that accurate yield and conversion measurements could be made for the two stages individually, the two continuous oxidations were run at different times. In the first stage, the continuous oxidation of the sulfide to sulfoxide was performed, the sulfoxide stored, and quantities measured for yield calculations. The sulfoxide thus obtained was then oxidized to the sulfone in a continuous system. Yield calculations were made across the first stage and these calculations were then employed to calculate the yield across the second. The combination gave the yield of p-chlorophenyl methyl sulfone based on p-chlorophenyl methyl sulfide.

Chlorophenyl methyl sulfide (sulfide) of 93.8%w p-isomer was fed into the first reactor using a Zenith variable speed pump. Nitrogen dioxide was pressured under oxygen into the reactor from an ice-jacketed calibrated Jerguson gauge through a needle valve controlled rotameter. Oxygen was fed under demand control from separate cylinders into each reactor. The sulfoxide product from the first reactor was pressure fed into a storage vessel which was maintained at about 50° C. using a variable intensity infrared lamp. This sulfoxide from the first reaction was fed from the storage vessel into the second reactor using a Zenith pump. All lines containing the sulfoxide were traced, and maintained at about 50° C. using a thermostated tempered water system. The sulfuric acid was pumped into the second reactor using a pressure feed system, wherein the flow rate was controlled by a needle valve and monitored through a calibrated rotameter. The sulfuric acid system included two sulfuric acid pressure reservoirs appropriately valved so that the pre-weighed vessel could cut in when a measurement was required.

The first stage was maintained at about 45° C. and 30–35 pounds per square inch during the reaction with a mole ratio of nitrogen dioxide/sulfide of 0.10 and a 0.75 hour residence time. The resulting product was stored in the intermediate storage vessel before continuing to the second stage. Each of the reactants were fed to the respective stage at a rate calculated to give the desired residence time.

A line out period of about five times the residence time and an equilibrium period of about twice the residence time was common for each stage.

The conditions of the second stage and the results of several preparations are summarized in Table I.

TABLE I

|  | 1 | 2 | 3 |
|---|---|---|---|
| Pressure (pounds per square in. gauge) | 50 | 50 | 25 |
| Temperature, °C | 99 | 109 | 96 |
| Residence Time, Hr. | 3.0 | 3.9 | 4.9 |
| Mole NO₂/mole sulfide | 0.43 | 0.57 | 0.44 |
| Mole H₂SO₄/mole sulfide | 0.92 | 1.00 | 0.62 |
| *Conversion — % molar | 90 | 97 | 90 |

| *Yield — % molar | 83 | 87 | 81 |
| *Selectivity — % molar | 93 | 90 | 91 |

*Based on p-chlorophenyl methyl sulfide.

We claim as our invention:

1. The process for the production of an aryl alkyl sulfone of the formula:

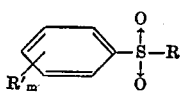

wherein R is alkyl containing from 1 to 20 carbon atoms, R' is halogen and m is an integer of from 0 to 5, which comprises reacting a mixture of the corresponding sulfoxide with a nitrogen oxide in the presence of sulfuric acid and molecular oxygen, at a temperature of from about 25° C. to about 150° C. wherein the molar ratio of nitrogen dioxide to sulfoxide is from about 0.05 to 1 to about 3 to 1 and the molar ratio of sulfuric acid to sulfoxide is from about 0.1 to 1 to about 10 to 1.

2. The process of claim 1 wherein R contains from one to four carbon atoms, R' is chlorine or bromine, m is 1 or 2 and the nitrogen oxide is nitrogen dioxide.

3. The process according to claim 2 wherein R is methyl, R' is chlorine, m is 1 and the chlorine is situated para to the position at which the sulfur is attached to the aromatic ring.

4. The process for the production of a mixture of aryl alkyl sulfones of the formulas:

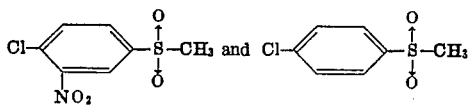

which comprises reacting p-chlorophenyl methyl sulfoxide with nitrogen dioxide in the presence of fuming sulfuric acid and molecular oxygen, at a temperature of from about 25° C. to about 150° C. wherein the molar ratio of nitrogen dioxide to sulfoxide is from about 0.05 to 1 to about 3 to 1 and the molar ratio of sulfuric acid to sulfoxide is from about 0.1 to 1 to about 10 to 1.

5. The process for the production of an aryl alkyl sulfone of the formula:

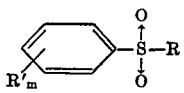

wherein R is alkyl containing from one to 20 carbon atoms, R' is halogen and m is an integer of from 0 to 5, which comprises:

a. reacting the corresponding sulfide with a nitrogen oxide in the presence of molecular oxygen to form the corresponding sulfoxide, and b. reacting the resulting crude reaction product containing the sulfoxide with a nitrogen oxide in the presence of sulfuric acid and molecular oxygen at a temperature of from about 25° C. to about 150° C. wherein the molar ratio of nitrogen dioxide to sulfoxide is from about 0.05 to 1 to about 3 to 1 and the molar ratio of sulfuric acid to sulfoxide is from about 0.1 to 1 to about 10 to 1 to form the desired product.

6. The process of claim 5 wherein R contains from one to four carbon atoms, R' is chlorine or bromine, m is 1 to 2 and the nitrogen oxide is nitrogen dioxide.

7. The process of claim 6 wherein R is methyl, R' is chlorine, m is 1 and the chlorine is situated para to the position at which sulfur is attached to the aromatic ring.

8. The process for the production of a mixture of aryl alkyl sulfones of the formulas:

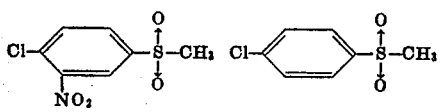

which comprises reacting p-chlorophenyl methyl sulfide with nitrogen dioxide in the presence of molecular oxygen to form the corresponding sulfoxide and reacting the resultant crude reaction product with nitrogen dioxide in the presence of fuming sulfuric acid and molecular oxygen, at a temperature of from about 25° C. to about 150° C. wherein the molar ratio of nitrogen dioxide to sulfoxide is from about 0.05 to 1 to about 3 to 1 and the molar ratio of sulfuric acid to sulfoxide is from about 0.1 to 1 to about 10 to 1.

9. The process for the production of a nitrated aryl alkyl sulfone of the formula:

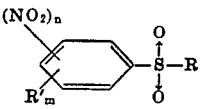

wherein R is alkyl containing from one to 20 carbon atoms, R' is halogen, m is an integer from 0 to 4 and n is 1 or 2, which comprises:

a. reacting the corresponding sulfoxide with a nitrogen oxide in the presence of sulfuric acid and molecular oxygen at a temperature of from about 25° C. to about 150° C. wherein the molar ratio of nitrogen dioxide to sulfoxide is from about 0.05 to 1 to about 3 to 1 and the molar ratio of sulfuric acid to sulfoxide is from about 0.1 to 1 to about 10 to 1 and b. reacting the resultant crude reaction product with fuming sulfuric acid and nitric acid to form the said sulfone.

10. The process according to claim 9 wherein R is methyl, R' is chlorine, m is 1, the chlorine is situated para to the position at which the sulfur is attached to the aromatic ring and the nitrogen oxide is nitrogen dioxide.

11. The process for the production of a nitrated aryl alkyl sulfone of the formula:

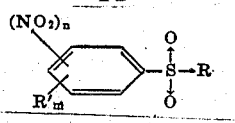

wherein R is alkyl containing from 1 to 20 carbon atoms, R' is halogen, n is 1 or 2 and m is an integer of from 0 to 4, which comprises:

a. reacting the corresponding sulfide with a nitrogen oxide and molecular oxygen for a time sufficient to form the corresponding sulfoxide;

b. reacting the resulting crude reaction product containing the sulfoxide with a nitrogen oxide in the presence of sulfuric acid and molecular oxygen at a temperature of from about 25° C. to about 150° C. wherein the molar ratio of nitrogen dioxide to sulfoxide is from about 0.05 to 1 to about 3 to 1 and the molar ratio of sulfuric acid to sulfoxide is from about 0.1 to about 10 to 1 to form the desired product; and c. reacting the resulting crude reaction product containing the sulfone with fuming sulfuric acid and nitric acid to form the said nitrated alkyl aryl sulfone.

12. The process according to claim 11 wherein R is methyl, R' is chlorine, m is 1, n is 1 or 2, chlorine is situated para to the position on the ring at which the sulfur is located and the nitrogen oxide is nitrogen dioxide.

13. The process according to claim 1 wherein the molar ratio of nitrogen dioxide to sulfoxide is from about 0.15 to 1 to about 0.5 to 1 and the molar ratio of sulfuric acid to sulfoxide is from about 0.3 to 1 to about 3.0 to 1.

14. The process according to claim 1 wherein the temperature is from about 40° C. to about 120° C.

* * * * *